US009328762B2

(12) United States Patent
Tanaka et al.

(10) Patent No.: US 9,328,762 B2
(45) Date of Patent: May 3, 2016

(54) PIERCE NUT FOR HIGH-STRENGTH STEEL PLATE

(71) Applicant: Aoyama Seisakusho Co., Ltd., Niwa-Gun (JP)

(72) Inventors: Mamoru Tanaka, Niwa-Gun (JP); Hidenori Ikami, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 25 days.

(21) Appl. No.: 14/278,412

(22) Filed: May 15, 2014

(65) Prior Publication Data

US 2014/0248104 A1 Sep. 4, 2014

Related U.S. Application Data

(63) Continuation of application No. PCT/JP2013/065454, filed on Jun. 4, 2013.

(30) Foreign Application Priority Data

Aug. 27, 2012 (JP) ................................. 2012-186014

(51) Int. Cl.
*F16B 37/04* (2006.01)
*F16B 37/00* (2006.01)
*F16B 37/06* (2006.01)

(52) U.S. Cl.
CPC ............... *F16B 37/00* (2013.01); *F16B 37/068* (2013.01)

(58) Field of Classification Search
CPC ......... F16B 37/00; F16B 37/04; F16B 37/068
USPC ............................. 411/180, 427, 143, 19, 25
See application file for complete search history.

(56) References Cited

U.S. PATENT DOCUMENTS 3,253,631 A * 5/1966 Reusser ................ F16B 37/068
29/432
7,740,436 B2 * 6/2010 Pamer .................... B21K 1/702
411/179

FOREIGN PATENT DOCUMENTS

| EP | 2 016 298 B1 | 8/2013 |
| JP | 64-058807 A1 | 3/1989 |
| JP | 03-028514 A1 | 2/1991 |
| JP | 11-193808 A1 | 7/1999 |
| JP | 2009-534612 A1 | 9/2009 |

OTHER PUBLICATIONS

International Search Report (Application No. PCT/JP2013/065454) dated Jul. 2, 2013.

* cited by examiner

Primary Examiner — Gary Estremsky
(74) Attorney, Agent, or Firm — Burr & Brown, PLLC

(57) ABSTRACT

A pierce nut used for a high-strength steel plate according to the invention includes a female screw thread portion formed in the center of a nut body, an annular piercing portion projecting around the female thread portion, and an annular outer peripheral projection extending from the periphery of the nut body. The outer periphery of the piercing portion forms a first sloping surface increasing in diameter toward the leading end thereof, and also the inner peripheral surface of the outer peripheral projection forms a second sloping surface increasing in diameter toward the leading end thereof. Serrations are formed on the second sloping surface. Even where a mating member is a high-strength steel plate, the pierce nut according to the invention can ensure the same peeling strength and rotation torque as with a conventional nut, without deformation of the pierce nut itself.

2 Claims, 4 Drawing Sheets

PIERCE NUT FOR HIGH-STRENGTH STEEL PLATE

TECHNICAL FIELD

The present invention relates to a pierce nut used for a high-strength steel plate.

BACKGROUND ART

Conventionally, many pierce nuts are used in vehicles, typically automobiles. In general, a pierce nut includes a female screw thread portion formed in the center of a nut body, an annular piercing portion projecting around the female screw thread portion, and an annular outer peripheral projection extending from the periphery of the nut body.

Therefore, by driving the pierce nut into a steel plate, which is a mating member of the nut, the piercing portion runs through the mating member to make a circular hole therein, and at the same time, plastically deforms the steel plate around the peripheral edge portion of the hole by virtue of plasticity such that the steel plate flows into an annular groove formed between the piercing portion and the outer peripheral projection. Consequently, the pierce nut is securely fixed to the mating member. Thus, the pierce nut is used for screw-attaching another component.

Compared to a weld nut, which is welded and fixed to a mating member, a pierce nut has an advantage not only in that the need to form a prepared hole in the mating member is eliminated, but also in that the need to partially heat the mating member is eliminated. Accordingly, many pierce nuts are used as vehicle components in particular.

However, in recent years, use of a high-strength steel plate called "high-tension steel plate" has been increasing in order to reduce the weight of an automobile. This high-strength steel plate is harder and less likely to be deformed than an ordinary steel plate. Therefore, a conventional pierce nut has a problem in that its peeling strength after attachment insufficient.

FIGS. 1(A) and 1(B) are sectional views illustrating the foregoing state. FIG. 1(A) shows the case of an ordinary steel plate, and FIG. 1(B) shows the case of a high-strength steel plate. In FIG. 1(A), the steel plate S plastically flows into an annular groove 3 between the piercing portion 1 and the outer peripheral projection 2 such that the pierce nut is securely fixed to the steel plate S. The inner peripheral surface of the outer peripheral projection 2 forms a sloping surface decreasing in diameter toward the leading end thereof. In this description, the leading end refers to the direction in which the end is further away from the nut body in the axial direction thereof.

However, in FIG. 1(B), since the hardness of the steel plate S is high, the steel plate S cannot sufficiently flow into the annular groove 3. Moreover, the outer peripheral projection 2 of the pierce nut is liable to be deformed such that this projection 2 inclines inward. Consequently, the strength of the pierce nut against separation from the steel plate S decreases, and also contact of the steel plate S with the outer peripheral projection 2 is insufficient, resulting in insufficient rotation torque.

A pierce nut for a high-strength steel plate is disclosed in Patent Document 1. The pierce nut for a high-strength steel plate does not include a conventional outer peripheral projection 2. However, in place of the projection 2, this pierce nut has an outer groove, an annular projection, and an inner groove in order to enhance the contact between the high-strength steel plate and the pierce nut, thereby ensuring rotation torque. However, complete elimination of the outer peripheral projection 2 may lead to a decrease in peeling strength of the pierce nut from the steel plate.

CITATION LIST

Patent Document

[Patent Document 1] JP 2009-534612 W

SUMMARY OF THE INVENTION

Technical Problem

It is accordingly an object of the invention to solve the conventional problems described above and to provide a pierce nut for a high-strength steel plate which, even where a mating member is a high-strength steel plate, can ensure the same peeling strength and rotation torque as with a conventional nut, without deformation of the pierce nut itself.

Solution to Problem

The invention to solve the foregoing invention provides a pierce nut used for a high-strength steel plate. The pierce nut includes a female screw thread portion formed in the center of a nut body, an annular piercing portion projecting round the female thread portion, and an annular outer peripheral projection extending from the periphery of the nut body. The outer periphery of the piercing portion forms a first sloping surface increasing in diameter toward the leading end thereof, and also the inner peripheral surface of the outer peripheral projection forms a second sloping surface increasing in diameter toward the leading end thereof. Serrations are formed on the second sloping surface.

According to the second aspect of the present invention, it is preferable that the central angle of the second sloping angle be greater than the central angle of the first sloping surface.

According to the third aspect of the present invention, it is preferable that the inner peripheral surface of the piercing portion form a third sloping surface increasing in diameter toward the leading end thereof.

Advantageous Effects of the Invention

In a pierce nut for a high-strength steel plate according to the invention, the outer peripheral surface of a piercing portion forms a first sloping surface, and also the inner peripheral surface of an outer peripheral projection forms a second sloping surface increasing in diameter toward the leading end thereof, and an annular groove is formed between these sloping surfaces. In contrast to a conventional pierce nut in which the inner peripheral surface of an outer peripheral projection forms a sloping surface decreasing in diameter toward the leading end thereof, the pierce nut according the invention is configured such that the corresponding inner peripheral surface forms a sloping surface increasing in diameter toward the leading end thereof. Accordingly, even where a mating member is a high-strength steel plate, the peripheral edge portions of the hole in the steel plate, made by the piercing portion as a result of having run through it, easily flow into the annular groove. The inner peripheral edge portion of the steel plate, which has flowed into the annular groove, comes into secure contact with the outer periphery of the piercing portion, and thus peeling strength in the axial direction can be ensured.

Additionally, the outer peripheral edge portion of the steel plate, which has flowed into the annular groove, comes into secure contact with the inner periphery of the outer peripheral projection. However, since this inner periphery has serrations, sufficient rotation torque can be ensured. Moreover, the outer peripheral projection has a trapezoidal sectional shape in which the dimension on the nut body side is wide, thus increasing rigidity and preventing conventional deformation.

DETAILED DESCRIPTION OF THE INVENTION

An embodiment according to the invention will be described below. A pierce nut for a high-strength steel plate according to the invention can also be used for a high-strength steel plate for which a conventional pierce nut cannot be used. A pierce nut according to the invention can also be used for a conventional low-strength steel plate.

Figure 1A:
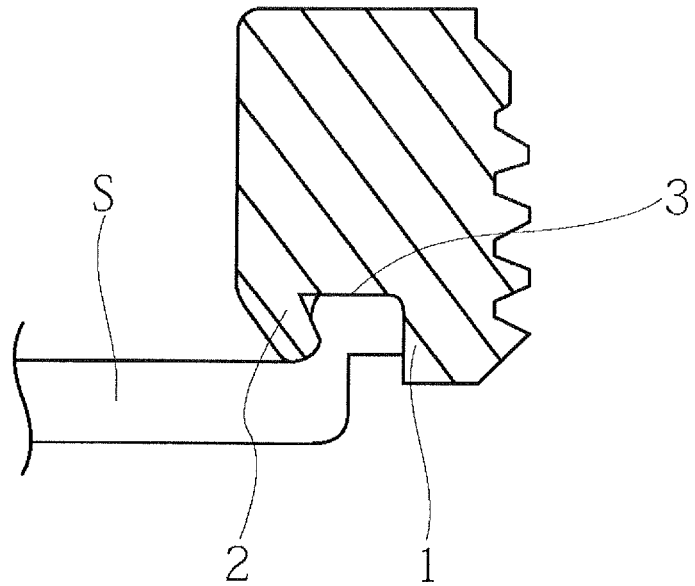
FIG. 1 shows sectional views of a principal part of a conventional pierce nut driven into a steel plate, in which (A) illustrates a case where the steel plate is an ordinary steel plate and (B) illustrates a case where the steel plate is a high-strength steel plate.
Figure 1B:
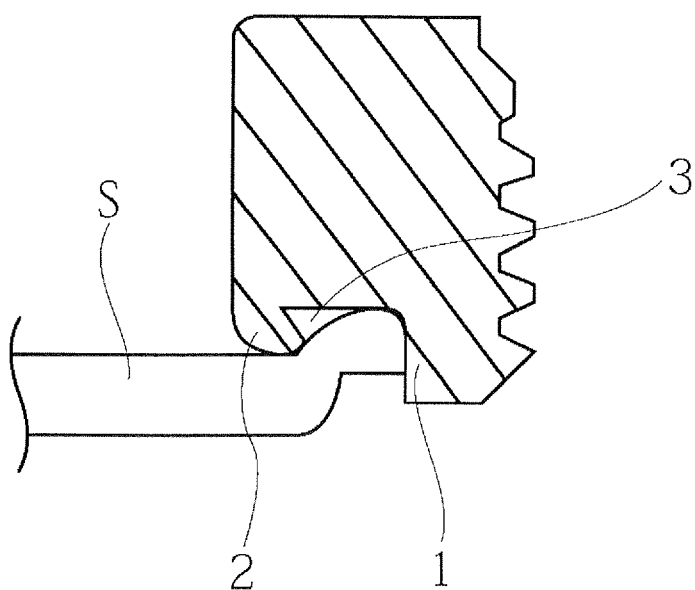
Figure 2:
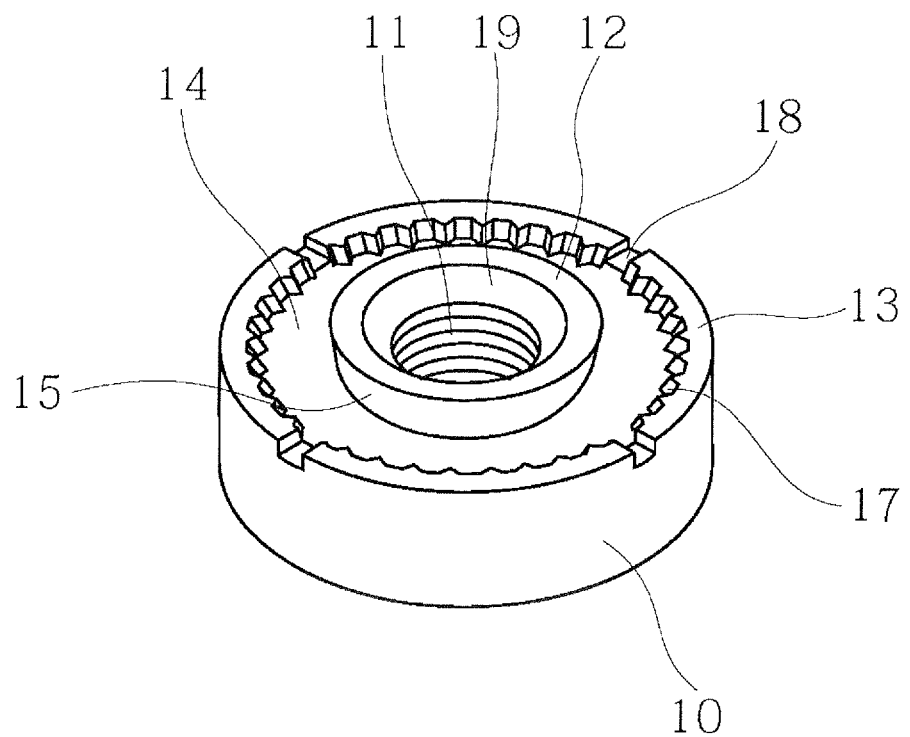
FIG. 2 is a perspective view of a pierce nut for a high-strength steel plate according to the invention.
Figure 3:
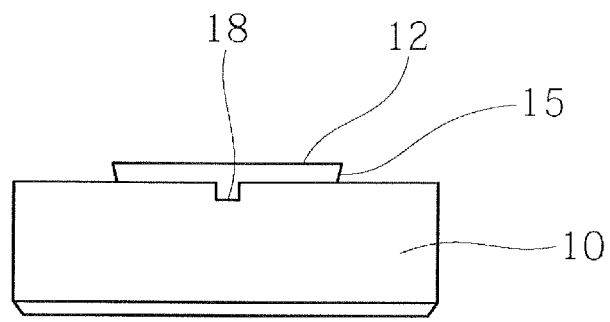
FIG. 3 is a front view of the pierce nut for a high-strength steel plate according to the invention.
Figure 4:
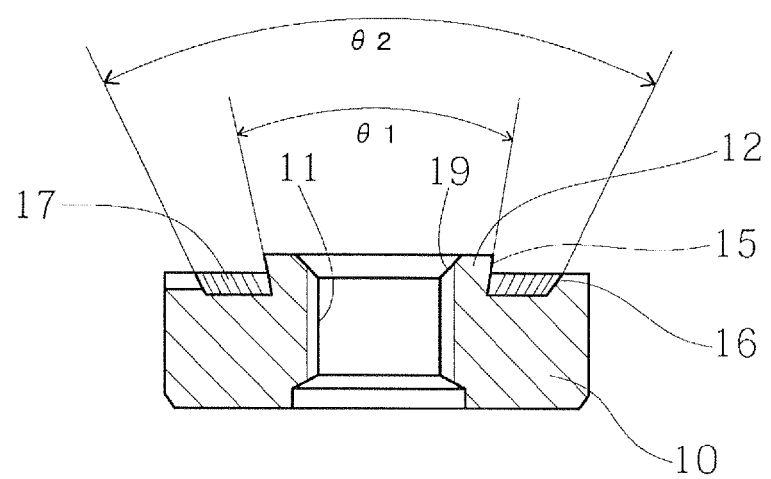
FIG. 4 is a sectional view of the pierce nut for a high-strength steel plate according to the invention.

FIGS. 2 to 4 show a pierce nut for a high-strength steel plate. The reference 10 represents a nut body in a short cylindrical form; 11, a female screw thread portion formed in the center of the nut body; 12, an annular piercing portion formed on the outer periphery of the female screw thread portion 11; 13, an annular outer peripheral projection extending from the outer periphery of the nut body 10; 14, an annular groove formed between the piercing portion 12 and outer peripheral projection 13. As shown in FIG. 3, the height of the projection of the piercing portion 12 is greater than that of the outer peripheral projection 13. The nut body 10 is submitted to hardening treatment such as heat treatment.

The outer peripheral surface of the piercing portion 12 forms a first slanting surface 15 increasing in diameter toward the leading end thereof. Its central angle θ1 is about 10° to 30°. Additionally, the inner peripheral surface of the outer peripheral projection 13 forms a second slanting surface 16 increasing in diameter toward the leading end thereof. Its central angle θ2 is, in this embodiment, 60°. However, it can vary according to the strength of the high-strength steel plate, which is a mating member. Specifically, where the strength is higher, the central angle θ2 is made greater than 60° and, where the strength is lower, the central angle θ2 is made less than 60°. The preferable range of the central angle θ2 for the second sloping surface 16 is 40° to 80°.

As described above, the central angle θ2 of the second sloping surface 16 is greater than the central angle θ1 of the first sloping surface 15. Accordingly, the annular groove 14 formed between them has a sectional shape in which the leading end side of the annular groove 14 is wider than its bottom, which is located on the same side as the nut body 10. Accordingly, a steel plate is able to flow into the groove.

As shown in FIG. 2, serrations 17 are formed on the second sloping surface 16. In this embodiment, the serrations 17 are provided by forming mountain-shaped projections all the way around the second sloping surface 16. The serrations 17 dig into the steel plate that has flowed into the annular groove 14 and thus sufficient rotation torque can be obtained. However, the shape of the serrations 17 can be variously modified, and the number thereof is not limited by this embodiment either.

Additionally, in this embodiment, four grooves 18 are formed in the end face of the outer peripheral projection 13. However, they are not the principal part of this invention and can be omitted.

The inner peripheral surface of the piercing portion 12 forms a third sloping surface 19 increasing in diameter toward the leading end thereof. The third sloping surface 19 functions as a guide to the female screw thread portion 11.

Figure 5:
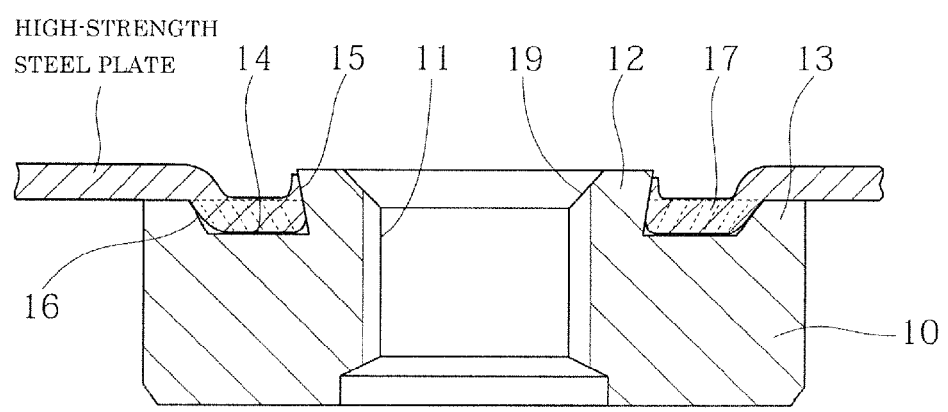
FIG. 5 is a sectional view of a principal part of the pierce nut for a high-strength steel plate according to the invention, driven into the high-strength steel plate.

The pierce nut according to the invention, which is thus configured, is used for a high-strength steel plate and is driven thereinto by means of a punch in the same manner as with a conventional nut. At this time, the piercing portion 12 runs through the steel plate, which is a mating member, making a circular hole in it, and simultaneously allows a plastic flow of the steel plate around the circular hole, such that the steel plate is brought into secure contact with the inside of the annular groove 14, as shown in FIG. 5. Unlike a conventional pierce nut, the inner peripheral surface of the outer peripheral projection 13 forms the second sloping surface 16 increasing in diameter toward the leading end thereof. Accordingly, even a high-strength steel plate with high hardness is allowed to flow easily into the annular groove 14 and consequently brought into secure contact with the annular groove 14. Additionally, the outer peripheral projection 13 has a trapezoidal section of which the dimension on the same side as the nut body 10 is wide. Accordingly, even when the piercing portion 12 is driven into a high-strength steel plate, the outer peripheral projection 13 is prevented from being deformed as in a conventional one.

As shown in FIG. 5, the steel plate that has flowed into the annular groove 14 is in secure contact with the first sloping surface 15 increasing in diameter toward the leading end thereof, thus making it possible to ensure the strength of the pierce nut against axial separation. If load to separate the pierce nut body 10 from the steel plate is applied, stress to flatten out the steel plate that has flowed into the annular groove 14 may be produced. However, the outer periphery of the steel plate that has flowed into the annular groove 14 is restricted by the inner peripheral surface of the outer peripheral projection 13 and, moreover, the high-strength steel plate is less likely to deform. Accordingly, the pierce nut is able to withstand the load that would separate the pierce nut.

Since the steel plate that had flowed into the annular groove 14 has been dug into by the serrations 17 formed on the inner peripheral surface of the outer peripheral projection 13, sufficient rotation torque can be obtained.

A pierce nut with a diameter of 17.5 mm for a high-strength steel plate according to the invention was driven into a high-strength steel plate with a thickness of 1.4 mm and a tensile strength of 980 MPa, and peeling strength and rotation torque were measured (in which N=10). It was found that the pierce nut for a high-strength steel plate according to the invention was 3.2 to 3.8 kN in peeling strength. Also, it was found that the pierce nut for high-strength steel plate according to the invention was 20 to 35 N·m in rotation torque. Peeling strength refers to force required to vertically pull an engaged pierce nut off a plate surface, and rotation torque refers to torque required to idly rotate an engaged pierce nut with respect to a plate surface.

The value of peeling strength was obtained in the following manner: a pierce nut to be tested, which had been driven into a steel plate, was set on a jig with a central hole formed in it, a bolt was screwed into the pierce nut, pressure was applied vertically downward to the bolt by a compression testing machine, and the load at which the pierce nut was separated from the steel plate was measured. The rotation torque value was obtained in the following manner: a bolt was screwed into a pierce nut to be tested, which had been driven into a steel plate, then, using a torque wrench with a socket attached thereto, the head of the bolt was rotated in tightening direction, and torque at which the pierce nut was separated from the steel plate was measured.

As described above, the pierce nut for a high-strength steel plate according to the invention has an advantageous effect that, even where a mating member is a high-strength steel plate, the pierce nut can ensure the same peeling strength and rotation torque as with a conventional nut, without deformation of the pierce nut itself.

DESCRIPTION OF THE REFERENCE NUMERAL

1 Piercing portion
2 Outer peripheral projection
3 Annular groove
10 Nut body
11 Female screw thread portion
12 Piercing portion
13 Outer peripheral projection
14 Annular groove
15 First sloping surface
16 Second sloping surface
17 Serration
18 Groove
19 Third sloping surface

The invention claimed is:

1. A pierce nut that is adapted to be driven into engagement with a high-strength steel plate, the high-strength steel plate is a high-tension steel plate having a tensile strength of at least 980 MPa, the pierce nut comprising:

a female screw thread portion formed in a center of a nut body;

an annular piercing portion projecting around the female thread portion; and an annular outer peripheral projection extending from the periphery of the nut body, wherein the outer periphery of the piercing portion forms a first sloping surface increasing in diameter toward a leading end thereof, and also the inner peripheral surface of the outer peripheral projection forms a second sloping surface increasing in diameter toward a leading end thereof, and wherein serrations are formed on the second sloping surface and the first sloping surface central angle is between 10° to 30°, and the second sloping surface central angle is between 40° to 80°, and wherein the first sloping surface and the serrations formed on the second sloping surface are adapted to be engaged with the high-strength steel plate.

2. The pierce nut that is adapted to be driven into engagement with a high-strength steel plate according to claim 1, wherein the inner peripheral surface of the piercing portion forms a third sloping surface increasing in diameter toward a leading end thereof.

* * * * *